United States Patent [19]
Welz

[11] Patent Number: 5,893,584
[45] Date of Patent: Apr. 13, 1999

[54] METHOD AND APPARATUS FOR OPENING A GAS CONTAINER

[75] Inventor: Siegfried Welz, Geislingen, Germany

[73] Assignee: Welz Industrie-produkte GmbH, Fellbach, Germany

[21] Appl. No.: 09/112,395

[22] Filed: Jul. 8, 1998

[30] Foreign Application Priority Data

Jul. 8, 1997 [DE] Germany ............ 197 29 076

[51] Int. Cl.$^6$ ............ B60R 21/32; B60R 21/26
[52] U.S. Cl. ............ 280/737; 280/735; 280/736
[58] Field of Search ............ 280/735, 737, 280/736, 741

[56] References Cited

U.S. PATENT DOCUMENTS

| | | | |
|---|---|---|---|
| 3,749,282 | 7/1973 | Day et al. | 280/737 |
| 4,666,182 | 5/1987 | Breed | 280/734 |
| 5,152,550 | 10/1992 | Hoagland et al. | 280/737 |
| 5,421,609 | 6/1995 | Moore et al. | 280/737 |
| 5,429,386 | 7/1995 | Mihm | 280/734 |
| 5,678,856 | 10/1997 | Headley | 280/737 |

FOREIGN PATENT DOCUMENTS 1951324  4/1997  Germany.

Primary Examiner—Robert J. Oberleitner
Assistant Examiner—Jeff Restifo
Attorney, Agent, or Firm—Robert W. Becker & Associate

[57] ABSTRACT

A method and apparatus for opening a gas container that via a filling opening is connected to an air bag of an impact of protection unit for the interior of a motor vehicle are provided. The tip of an electrode, which is under spring pressure, contacts the safety disc, thereby achieving a rapid, point-type beginning of melting of the safety disc followed by an intensive electric arc of constant length and high penetration speed.

15 Claims, 1 Drawing Sheet

METHOD AND APPARATUS FOR OPENING A GAS CONTAINER

BACKGROUND OF THE INVENTION

The present invention relates to a method and apparatus for opening a gas container that via a filling opening is connectable to an air bag of an impact protection means for the interior of a motor vehicle. The filling opening is closed off by a safety disc.

Inflatable air bags serve to protect the occupants of motor vehicles. Their effectiveness depends, among other things, upon the functional reliability and speed of the their release mechanism.

DE 195 13 242 C2 discloses a filling device for the air bag of an impact protection means. Upon triggering or release of the impact protection means, the safety disc of a gas container is weakened and thereby made to burst or crack under the pressure of stored gas. This is accomplished by means of an electrode that is spaced from the safety disc and operates with sparks, or by an electrode that is in contact with the safety disc and operates by resistance heating.

The electrode of the aforementioned reference is ring or cylinder shaped, and has a large effective surface area relative to the safety disc.

The drawback of using a spark effect is the high firing voltage that is required, which amounts to 3 KV at only 0.8 mm electrode spacing. In the manner of spark ignition this can be produced with an ignition coil, the continuous current of which is interrupted at the moment of ignition to induce a high voltage pulse. However, already for energy reasons, a continuous current in a motor vehicle does not even come under discussion.

A rapid heating of the safety disc by electrical resistance presumes in the present situation a high electrical power, which requires a large energy storage means.

It is therefore an object of the present invention to provide a method and apparatus for reliably, rapidly and with little structural expense being able to open the gas container of an impact protection means for the interior of motor vehicles, thus overcoming the drawbacks of heretofore known devices, namely considerable structural expense, a require for a lot of space, and a relatively long ignition delay.

BRIEF DESCRIPTION OF THE DRAWINGS

This object, and other objects and advantages of the present invention, will appear more clearly from the following specification in conjunction with the accompanying schematic drawing, in which.

SUMMARY OF THE INVENTION

Figure 1:
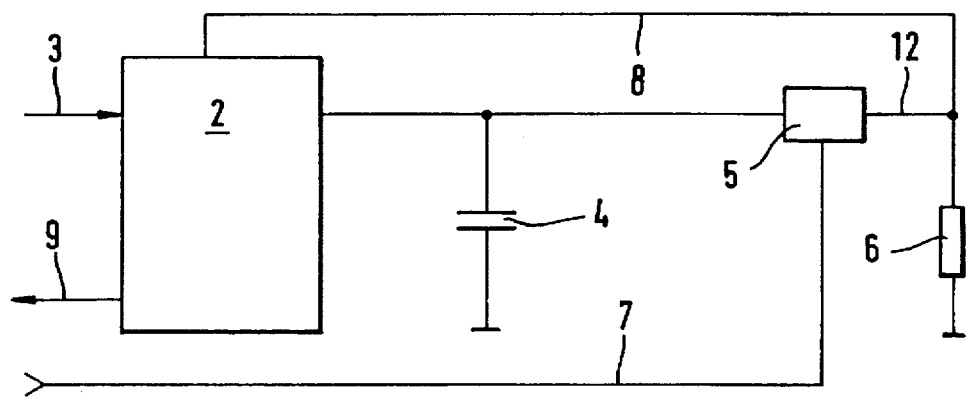
FIG. 1 shows one exemplary circuit diagram for the release electronics of the present invention.

The method of the present invention is characterized primarily by providing an electrode that contacts the safety disc and is in a circuit with the safety disc such that when current is applied the safety disc melts where the electrode contacts it, thus forming a gap between the electrode and the safety disc that triggers an electric arc leading to further melting and finally to bursting of the safety disc under the pressure of stored gas.

As a consequence of the additive effect of the resistance heating and the arc heating of the safety disc, a rapid, point-type melting and an intensive crater formation occurs below the electrode. The weakening of the safety disc that is associated therewith causes a rapid bursting of the safety disc under the high pressure of the stored gas. The electric arc heating is particularly effective and rapid since the arc has an extremely high temperature and a small effective cross-sectional area. By means of a good utilization of the electrical energy, the power source can be small and hence cost effective.

Pursuant to one specific embodiment of the inventive method, the electrode follows into the growing depth of the melt crater, as a result of which the length or height of the arc, and hence its power requirement, remain approximately constant. As a result of this following process, the electrical energy that is present is optimally utilized and the size and cost for the power source required are minimized.

The apparatus of the present invention is characterized by an electrode that is provided with a tip that is in contact with the safety disc, the electrode and the safety disc being present in an electrical circuit.

As a consequence of the tip or point of the electrode, only a point-type contact is achieved with the safety disc. This results in a high current density and a small volume in the safety disc that has to be heated up, thus leading to a rapid beginning of melting of the safety disc. The gap that is thereby formed between the electrode and the safety disc triggers an electrical arc that is concentrated upon the tip of the electrode and is thereby particularly effective. In this way, a reliable and rapid melting and bursting of the safety disc are achieved.

Subjecting the electrode to the pressure of a compression spring that is coordinated with the mass of the electrode effects a particularly straightforward and reliable following of the electrode. The compression spring requires no release and following mechanisms and is self-controlling.

The inventive selection of material for the electrode and the safety disc makes it possible for only the safety disc to be weakened by the current fluxes, whereas the electrode remains unchanged.

A precondition for an exact following of the electrode is a constant starting spring force of its compression spring, independent of deformations of the safety disc caused by temperature and gas pressure. This is achieved by supporting the compression spring on the safety disc.

By insulating the electrode relative to the support, exclusive current flux via the tip of the electrode is ensured; this is necessary for the desired rapid weakening of the safety disc.

For a long operational reliability of the impact protection means, it is important that a low contact or transfer resistance between the tip of the electrode and the safety disc be permanently ensured, and this can be provided by means of a soldered connection.

Further specific features of the present invention will be described in detail subsequently.

DESCRIPTION OF THE PREFERRED EMBODIMENTS

Referring now to the drawing in detail, the circuit diagram of the triggering or release electronics 1 of FIG. 1 shows a voltage transformer 2 that is connected with the power supply by means of an input 3. The power supply has a battery or lighting generator voltage of about 12 to 14 volts, which is raised in the transformer to about 80 volts. This voltage charges a capacitor 4 that has a capacitance of about 6.800 μF. The energy of the capacitor 4 is conveyed to a safety disc 6 by means of a transistor 5. Using a capacitor as an energy storage means has the advantage that even if the battery cable is torn off (for example in the event of an accident), the energy required for releasing the impact protection means is available.

The transistor 5 is activated or excited by means of a stepping or pulse line 7 that receives a release pulse from a non-illustrated acceleration pickup means. The release pulse has the signal level of the battery voltage.

The operational soundness of the release electronics can be tested by means of a test circuit 8; possible malfunctions are indicated by a trouble signal output 9.

Figure 2:
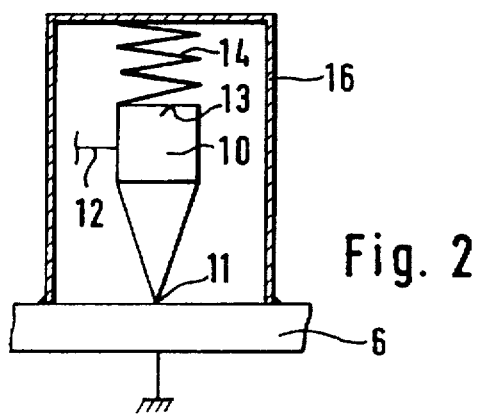
FIG. 2 illustrates a spring-biased electrode prior to release.

FIG. 2 illustrates an electrode 10, the tip or point 11 of which is soldered to the safety disc 6; the condition of FIG. 2 is prior to the release of the impact protection means. The electrode 10 is connected to the transistor 5 by means of a trigger line 12; the safety disc is connected to ground.

A compression spring 14 acts upon that end 13 of the electrode 10 that is remote from the safety disc 6; the compression spring 14 bears against a support 16 that is connected to the safety disc 6. The support 16 is electrically insulated relative to the electrode 10 so that the electrical current can pass to the safety disc only via the tip 11 of the electrode 10.

Figure 3:
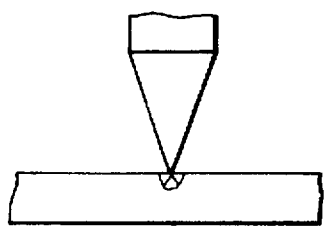
FIG. 3 shows the electrode of FIG. 2 shortly after formation of the arc.

FIG. 3 shows the tip 11 of the electrode 10 shortly after the release of the impact protection means. The safety disc 6 has begun to melt, and the arc begins the crater formation.

Figure 4:
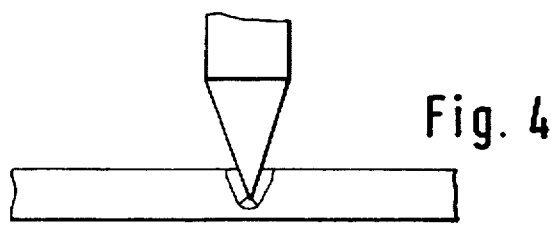
FIG. 4 shows the electrode in the crater shortly before the safety disc bursts.

FIG. 4 shows the advanced crater formation with the tip 11 of the electrode 10 penetrating into the crater, shortly before bursting of the safety disc 6.

FIGS. 3 and 4 illustrate the approximately constant length of the arc, which is a consequence of the automatic following of the electrode 10 under the effect of the compression spring 14. In this way, a substantial discharge of the capacitor 4 and a high melting speed of the safety disc 6 are achieved.

The specification incorporates by reference the disclosure of German priority document 197 29 076.0 of Jul. 8, 1997.

The present invention is, of course, in no way restricted to the specific disclosure of the specification and drawing, but also encompasses any modifications within the scope of the appended claims.

What is claimed is:

1. A method of opening a gas container that via a filling opening is connectable to an air bag of an impact protection means for the interior of a motor vehicle, said method including the steps:

providing a safety disc for closing off said filling opening; and providing an electrode that contacts said safety disc and is in a circuit with said safety disc such that when current is applied said safety disc melts where said electrode contacts it to form a gap between said electrode and said safety disc that triggers an electric arc leading to further melting and finally to bursting of said safety disc under the pressure of stored gas.

2. A method according to claim 1, which includes the step of applying pressure, when viewed in the direction of a longitudinal axis of said electrode, upon that end of said electrode that is remote from said safety disc, wherein said pressure is coordinated to the mass of said electrode, and wherein the burning-in speed of said electric arc into said safety disc, and the penetration speed of said electrode into the crater that is formed, are approximately of the same magnitude.

3. An apparatus for opening a gas container that via a filling opening is connectable to an air bag of an impact protection means for the interior of a motor vehicle, said apparatus comprising:

a safety disc as a closure for said filling opening; and an electrode that is provided with a tip that is in contact with said safety disc, said electrode and said safety disc being disposed in an electrical circuit.

4. An apparatus according to claim 3, which includes a compression spring that acts upon an end of said electrode that is remote from said safety disc.

5. An apparatus according to claim 4, wherein said electrode made of steel and said safety disc is made of easy to melt material.

6. An apparatus according to claim 5, wherein said safety disc is made of brass, copper or bronze.

7. An apparatus according to claim 4, wherein a support is provided for said compression spring, and wherein said support is connected to said safety disc.

8. An apparatus according to claim 7, wherein said support is electrically insulated relative to said electrode.

9. An apparatus according to claim 3, wherein said tip of said electrode is soldered to said safety disc.

10. An apparatus according to claim 9, wherein said electrode and said safety disc are provided with an electrically conductive corrosion protection.

11. An apparatus according to claim 4, wherein a capacitor is provided as a source of power for said electrical circuit.

12. An apparatus according to claim 11, wherein said capacitor has a voltage of between about 60 and 120 volts and a capacitance of about 6.800 μF.

13. An apparatus according to claim 12, wherein said capacitor has a voltage of about 80 volts.

14. An apparatus according to claim 11, wherein an electrical switch is provided for controlling said electrical circuit.

15. An apparatus according to claim 14, wherein said electrical switch is a transistor.

* * * * *